(12) United States Patent
Zhang et al.

(10) Patent No.: US 8,859,093 B2
(45) Date of Patent: *Oct. 14, 2014

(54) LOW-EMISSIVITY COATINGS

(71) Applicant: Intermolecular, Inc., San Jose, CA (US)

(72) Inventors: Xuena Zhang, San Jose, CA (US);
Dipankar Pramanik, Saratoga, CA (US)

(73) Assignee: Intermolecular, Inc., San Jose, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 13/728,889

(22) Filed: Dec. 27, 2012

(65) Prior Publication Data

US 2014/0186617 A1 Jul. 3, 2014

(51) Int. Cl.
C03C 17/09 (2006.01)
C03C 17/30 (2006.01)
C03C 17/38 (2006.01)
C03C 17/00 (2006.01)
C03C 17/36 (2006.01)

(52) U.S. Cl.
CPC .............. *C03C 17/36* (2013.01); *C03C 17/002* (2013.01)
USPC ........... 428/333; 428/336; 428/429; 428/432; 428/448; 428/450; 428/457; 427/165; 427/255.6; 427/404

(58) Field of Classification Search
CPC ....... B82Y 30/00; B82Y 40/00; B01L 3/5027
USPC ........ 427/250, 165, 255.6; 428/333, 428, 429
See application file for complete search history.

(56) References Cited

U.S. PATENT DOCUMENTS

2004/0180506 A1* 9/2004 Ramanath et al. ............ 438/343
2011/0262699 A1 10/2011 Yializis et al.

OTHER PUBLICATIONS

Sai et al.; Adhesion behaviour of self-assembled alkanethiol monolayers on silver at different stages of growth; May 4, 2007; IOP Publishing; Journal of Physics D: Applied Physics, pp. 3182-3189.
Laibinis et al.; Comparison of the Structures and Wetting Properties of Self-Assembled Monolayers of n-Alkanethiols on the Coinage Metal Surfaces, Cu, Ag, Au; 1991; Journal of American Chemical Society, vol. 113, No. 19; American Chemical Society, pp. 7152-7167.
Whitesides et al.; Molecular engineering of surfaces using self-assembled monolayers; 2005; Science Progress, pp. 17-48.
Aswal et al.; Self assembled monolayers on silicon for molecular electronics; Dec. 5, 2005; Elsevier B.V.; Analytica Chimica Acta, pp. 84-108.
Caro et al.; Screening self-assembled monolayers as Cu diffusion barriers; Apr. 22, 2008; Elsevier B.V.; Microelectronic Engineering, pp. 2047-2050.

* cited by examiner

*Primary Examiner* — Ramsey Zacharia

(57) ABSTRACT

Embodiments of the present invention include low emissivity (low-E) coatings and methods for forming the coatings. The low-E coating comprises a self-assembled monolayer (SAM) on a glass substrate, where one surface of the SAM is disposed in contact with and covalently bonded to the glass substrate, and one surface of the monolayer is disposed in contact with and covalently bonded to a metal layer. In some embodiments, the low-E coating comprises an assembly of one or more monomeric subunits of the following structure: $Si-(C_nH_y)-(LM)_m$ where n is from 1 to 20, y is from $2n-2$ to $2n$, m is 1 to 3, L is a Group VI element, and M is a metal, such as silver. In some embodiments, $(C_nH_y)$ can be branched, crosslinked, or cyclic. The coating can further comprise an antireflection coating on the metal layer.

20 Claims, 2 Drawing Sheets

LOW-EMISSIVITY COATINGS

CROSS REFERENCE TO RELATED APPLICATIONS

This application is related to commonly owned co-pending U.S. patent application Ser. No. 13/728,934, filed on Dec. 27, 2012, which is herein incorporated by reference for all purposes.

FIELD OF THE INVENTION

One or more embodiments of the present invention relate to low emissivity coatings on glass and glass manufacturing.

BACKGROUND

Low-emissivity (low-E) coatings are microscopically thin metal layers that are deposited on a window surface to inhibit heat transfer through infrared radiation across the glass. To improve thermal efficiency of heating or cooling, thin film coatings are applied to the raw glass to affect its reflective and transmissive properties. These coatings result in more thermal efficiency because radiant heat originating from indoors in winter is reflected from the coated windows back inside, while infrared heat radiation from the sun during summer is reflected away by the coated windows, keeping it cooler inside.

High tech glass products such as low-E glazings often have multilayered coatings which may include up to ten metal and oxide layers for anti-scratch, anti-reflective, etc. functionalities. The thermal control is typically provided by a silver layer which is an almost perfect mirror in the infrared range but sufficiently thin to be transparent in the visible range. The layer thus serves as a "heat mirror" or dichroic filter.

There are two primary methods of forming the thin film coatings: chemical vapor deposition and physical vapor deposition. For example, fluorinated tin oxide can be deposited at high temperatures using pyrolytic chemical vapor deposition. In another approach to forming thin film coatings, thin silver layer(s) with antireflection layers are formed by physical vapor deposition (PVD) in large vacuum chambers, requiring multiple deposition chambers to deposit 5 to 10 or more layers in succession. In addition, silver-based films are environmentally unstable and must be protected from exposure to water and air to maintain their properties over time.

With Ag deposited using PVD, many aspects of the Ag film must be controlled to ensure the best quality. In particular, adhesion of the Ag layer to the seed layer must be good. Agglomeration of Ag during initial deposition must be minimal or non-existent. Oxygen content in the Ag layer during nucleation and growth (deposition) must be low. The Ag must be in the preferred orientation (111). The subsequent post-deposition process steps must be controlled to ensure that the layer is not damaged after formation.

To achieve the lowest possible emissivity for a given thickness, the Ag film quality must be low resistivity, i.e., the Ag film should be continuous and of uniform thickness. However, the formation of a continuous film of silver is thermodynamically metastable. Without adequate adhesion to the substrate, thin films tend to reorganize into regions of thicker material and near-empty regions. Attempts have been made to strengthen the weakly adhesive metal/oxide interface by using a thin ZnO layer to increase the wetting and adhesion of the Ag layer. However, Ag adhesion on oxides is generally very poor. The poor adhesion results in agglomeration of Ag during deposition. The Ag is more likely to nucleate in a Volmer-Weber or Stranski-Krastanov growth mode, forming islands initially or after a thin wetting layer is formed.

The wettability can be further improved by adding a "seed layer," a metallic layer of, for instance, pure titanium, zirconium, or hafnium in the stack, or metal oxide layers. This "seed layer" is normally deposited by a PVD process or reactive magnetron sputtering process. For a metal oxide seeding layer, typically, a thin ZnO layer is used for Ag deposition. The crystalline hexagonal close packed (HCP; 002) orientation of crystalline ZnO film promotes Ag (111) nucleation. ZnO is also preferred (as opposed to a metal layer), because ZnO is a dielectric layer with less absorption than metal material choices that also have the desired characteristics as a seed layer.

Further optimization of ZnO layer includes inserting a metal-doped ZnO layer between the ZnO seed layer and Ag to provide a surfactant effect or using ZnO related alloys. The metallic layer or other "seed layers" must be thin enough that it does not affect the optical properties (does not increase light absorption). However, these solutions have not been entirely successful. The ZnO or alloys exhibit an interfacial energy of ~1.44 $J/m^2$, so the optimization of Zn alloys is limited to a narrow interfacial energy window. Moreover, oxygen in the metal oxide could diffuse into the metal reflective layer, which would increase its emissivity property, reducing the emissivity performance. In addition, the available process parameters for optimizing the Ag deposition process are limited.

SUMMARY OF THE INVENTION

Low emissivity ("low-E") coatings and methods for preparing the coatings are disclosed. The low emissivity coating allows visible light to pass and reflects infrared radiation. The low-E coating has high transmittance for visible light but low emissivity. Low-E coatings on a glass substrate comprise a self-assembled monolayer (SAM) and a metal layer, where the SAM forms a monolayer on the surface of the glass substrate, where one surface of the monolayer is disposed in contact with and covalently bonded to the glass substrate, and one surface of the monolayer is disposed in contact with and covalently bonded to metal atoms in the metal layer. The metal layer typically has a thickness of from 3 and 20 nm and comprises silver. The glass can be window glass or optical glass. The coating can further comprise an antireflection coating on the metal layer.

The SAM comprises one or more monomeric subunits of the following structure: —Si—$(C_nH_y)$-$(LM)_m$ where n is from 1 to 20, y is from 2n−2 to 2n, m is 1 to 3, L is a Group VI element, for example, S, Se, Te, but not O, and M is a metal such as Ag. Metal atoms on the surface of the metal layer in proximity to the SAM are covalently bonded to L moieties of the SAM. The hydrocarbon chain can be saturated, i.e., y=2n, for example, $(C_nH_y)$ can be —$C_{10}H_{20}$—. The hydrocarbon chain can be unsaturated, i.e., y=2n−2, for example, $(C_nH_y)$ can be —$C_{10}H_{18}$—. In some embodiments, $(C_nH_y)$ can be branched, crosslinked, or cyclic. In some embodiments, n is from 3 to 20. In some embodiments, n is from 4 to 20. In some embodiments, n is from 4 to 8. The leaving group X can be an O-alkyl group such as methoxy or ethoxy, or halo such as Cl. In some embodiments, n is from 4 to 8 and the hydrocarbon chain is unbranched (for a SAM thickness of approximately 1-2 nm). Where m is greater than one, the hydrocarbon chain is branched so that each hydrocarbon chain is terminated with a LH moiety.

Methods for preparing low-E coatings on a glass substrate comprise forming a SAM on one surface of a glass substrate, and depositing a metal on the SAM to form a metal layer; wherein the SAM comprises an assembly of one or more monomers, wherein each monomer comprises a first functional group capable of covalently bonding to the glass substrate and a second functional group capable of covalently bonding to a metal atom in the metal layer. The method further comprises heating the glass and SAM such that the SAM is covalently bonded to the glass substrate. The method can further comprise depositing an antireflective coating on the metal layer.

The step of forming a SAM can be performed by contacting the surface of the glass substrate with a solution comprising the one or more monomers and a solvent, for example, by contacting the glass substrate with a solution comprising one or more monomers using spin coating or dip coating. The forming step can also be performed by contacting the glass substrate with a gas comprising the one or more monomers using chemical vapor deposition. The step of depositing a metal on the SAM can be performed by physical vapor deposition, or contacting the SAM with a solution comprising metal ions. The metal typically is silver. The thickness of the metal layer is typically from 3 to 20 nm. The method can further comprise depositing additional metal on the metal layer if a thicker layer is desired.

In some embodiments, the first functional group capable of covalently bonding to the glass substrate is a silane. In some embodiments, the second functional group (L) is a thiol (e.g., —SH). The monomer has the structure $X_3$—Si—$(C_nH_y)$-$(LH)_m$ where n is from 1 to 20, y is from 2n−2 to 2n, m is 1 to 3, X is a leaving group, and L is a Group VI element, for example, S, Se, Te, but not O. The hydrocarbon chain can be saturated (x=2n, e.g., —$C_{10}H_{20}$-L), unsaturated (x=2n−2, e.g., —$C_{10}H_{18}$-L), branched, crosslinked, or cyclic. In some embodiments, n is from 4 to 8 (for a SAM of thickness about 1-2 nm). X is a leaving group such as O-alkyl (e.g., methoxy, ethoxy), or halo (e.g., Cl).

DETAILED DESCRIPTION

Figure 1:
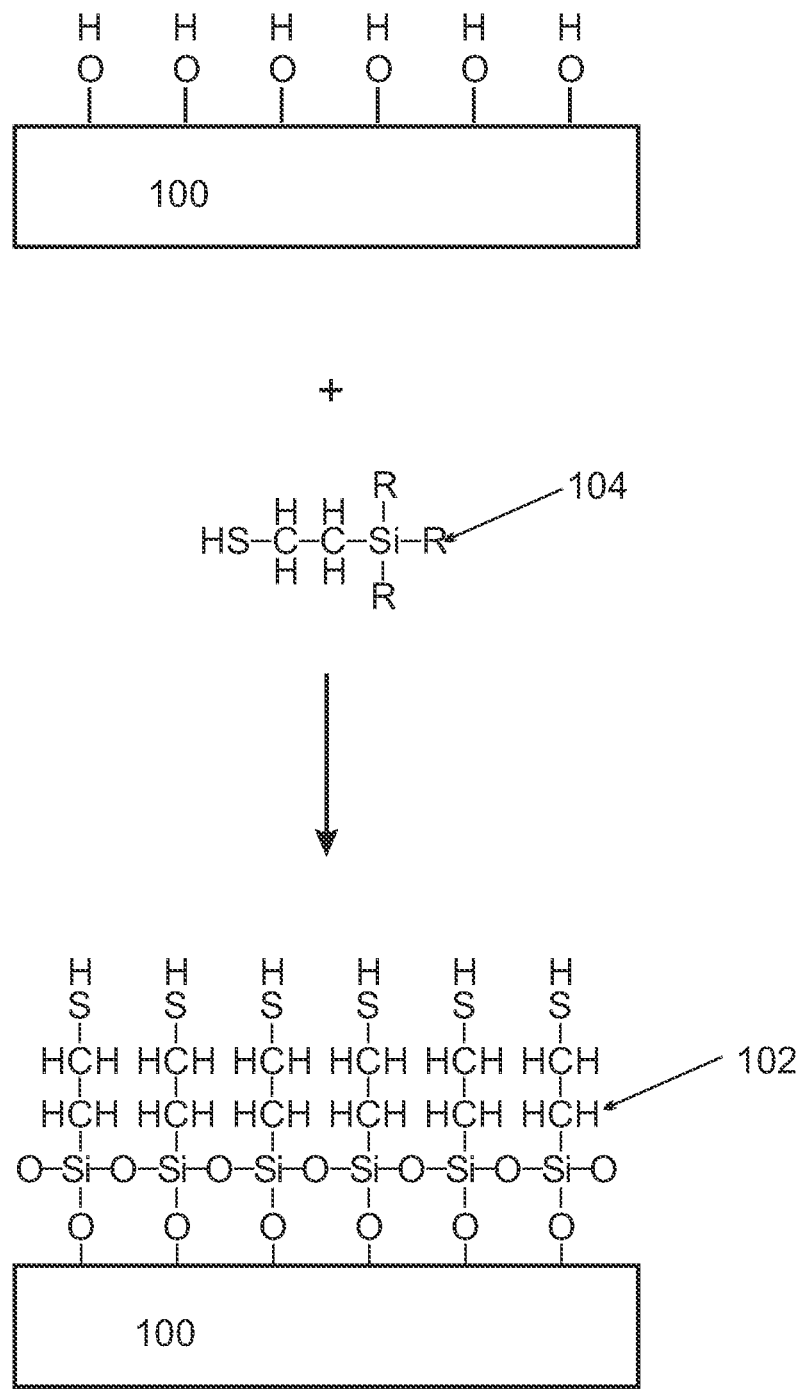
FIG. 1 shows a schematic illustration of one step of a method for forming a low emissivity coating on a substrate.

Before the present invention is described in detail, it is to be understood that unless otherwise indicated this invention is not limited to specific coating compositions or specific substrate materials. Exemplary embodiments will be described for low emissivity glass coatings, but other applications of the inventive methods can also be used. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a layer" includes two or more layers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" or "approximately" is used, the stated quantity can vary by up to 10%. Where the modifier "substantially equal to" is used, the two quantities may vary from each other by no more than 5%.

DEFINITIONS

The term "heating" or "heat treating" as used herein refers to a treatment with heat to promote reaction of a functional group of a SAM to form a covalent bond between the SAM and the glass substrate.

The term "self-assembled monolayer" as used herein refers to organic molecules in molecular assemblies formed spontaneously on surfaces by adsorption and organized into large ordered domains.

The term "wetting layer" as used herein refers to a layer that covers the substrate without leaving pinholes.

Embodiments of the present invention disclose low emissivity ("low-E") coatings and methods for forming low-E coatings. The low-E coating allows visible light to pass and reflects infrared radiation. The low-E coating comprises a self-assembled monolayer (SAM) on a glass substrate, where one surface of the SAM is disposed in contact with and covalently bonded to the glass substrate, and one surface of the monolayer is disposed in contact with and covalently bonded to metal atoms in a metal layer. The SAM comprises an assembly of one or more subunits comprising a first functional group covalently bonded to a glass substrate and a second functional group covalently bonded to the metal.

In some embodiments, monomers which form the self-assembled monolayer comprise three portions: i) a first functional group (a head group), i.e., a moiety that is capable of forming a chemical bond with the surface atoms on the glass substrate in an exothermic reaction (e.g., having a ΔG≈1.7 eV), resulting in the covalent bonding of the monomer to the substrate; and ii) a second functional group (a tail group), i.e., moiety that is capable of forming a covalent bond with a metal such as silver. A third portion of the monomer is iii) an alkyl or alkenyl chain, i.e., of the formula $(C_nH_y)$, where n is from 1 to 20, y is from 2n−2 to 2n connecting the first and second functional groups. The inter-chain van der Waals interactions between the alkyl chains assists in forming ordered molecular structure in the SAM, and is dependent on the density of covalently bonded head groups to the substrate. The thickness of the SAM is typically less than about 10 Å for n≈3.

In some embodiments, the SAM comprises one or more monomeric subunits of the following structure:

where n is from 1 to 20, y is from 2n−2 to 2n, m is 1 to 3, L is a Group VI element, for example, S, Se, Te, but not O, and M is a metal. The SAM is bonded to silanol residues present on the glass surface, i.e., the Si is covalently bonded to the Si—O—Si network of the silicon oxide layer on the silicon surface.

In some embodiments, the SAM is prepared from monomers having the formula $X_3$—Si—$(C_nH_y)$-$(LH)_m$, where X is a leaving group such as an O-alkyl group (e.g., methoxy, ethoxy), or halo (e.g., Cl) that covalently bonds to Si atoms on the glass surface, typically via reaction with silanol groups on the silica surface. Metal atoms on the surface of the metal layer in proximity to the SAM are covalently bonded to L moieties of the SAM. The metal layer can comprise any metal that forms a covalent bond with L, for example, S. Suitable metals include copper, gold, silver, platinum, or the like. In some embodiments, the metal is silver and L is sulfur. The hydrocarbon chain can be saturated, i.e., y=2n, for example, $(C_nH_y)$ can be —$C_{10}H_{20}$—. The hydrocarbon chain can be unsaturated, i.e., y=2n−2, for example, $(C_nH_y)$ can be —$C_{10}H_{18}$—. In some embodiments, $(C_nH_y)$ can be branched, crosslinked, or cyclic. In some embodiments, n is from 3 to 20. In some embodiments, n is from 4 to 20. In some embodiments, n is from 4 to 8. The leaving group X can be an O-alkyl group such as methoxy or ethoxy, or halo such as Cl. In some embodiments, n is from 4 to 8 and the hydrocarbon chain is unbranched (for a SAM thickness of approximately 1-2 nm). Where m is greater than one, the hydrocarbon chain is branched so that each hydrocarbon chain is terminated with a LH moiety. The metal layer can have a thickness of 3-20 nm. The coating can further comprise an antireflection coating on the metal layer. Typical substrates with low-E coatings include architectural glass such as window glass used in residential or commercial buildings, or optical glass such as is used for optical applications such as filters, lenses or prisms.

Substrates

Substrates can be any surface on which a low emissivity coating is desired. Most commonly, low emissivity coatings are applied to architectural glass for improved heating and cooling efficiencies, but one skilled in the art will recognize that low emissivity coatings can find use in a wide range of applications on a wide range of substrates. Typical substrates are glass substrates and are suitable for use as windows or glass doors for a building, enclosure, or vehicle. Substrates are generally flat, but in some embodiments, the substrates may exhibit curvature such as in domed windows and some skylights. In some embodiments, the substrates can have textured coatings. Substrates can include optical components such as windows, filters, prisms, lenses and components of optoelectronic devices.

Methods for Preparing Low Emissivity Coatings

Methods are provided for preparing low-E coatings on a glass substrate. The inventive methods for forming low-E coatings include using novel materials to create a seed layer to improve metal adhesion and nucleation. In some embodiments, a SAM comprising thiolated silanes (e.g., silane—$(CH_2)_n$—SH) bonded to metal (e.g., Ag) is used to form a low-E layer. The metal-thiolated SAM layer satisfies the following criteria: 1) The head group of the silane (Si—$X_3$) reacts with a $SiO_x$ substrate to form covalent Si—O—Si—$(CH_2)_n$—SH bonds. Due to the ordered structure provided by the hydrocarbon chains, these monolayers are tightly packed on $SiO_x$ surfaces. 2) The thiol terminal group allows the control of surface properties of the subsequent metal layer. The terminal thiol groups further react with metal to form covalent metal—S bonds, resulting in a complete wetting layer of metal (e.g., Ag).

The methods comprise forming a SAM on one surface of a glass substrate, and depositing a metal on the SAM to form a metal layer; wherein the SAM comprises an assembly of one or more monomers comprising a first functional group capable of covalently bonding to the glass substrate and a second functional group capable of covalently bonding to the metal. The method further comprises heating the glass and SAM such that the SAM is covalently bonded to the glass substrate. The method can further comprise depositing an antireflective coating on the metal layer.

The step of forming a SAM can be performed by contacting the surface of the glass substrate with a solution comprising the one or more monomers and a solvent, for example, by contacting the glass substrate with a solution comprising one or more monomers and a solvent or solvents, which can comprise acids, bases or water to aid in the reaction with the substrate surface. Typical solvents include organic solvents such as toluene, hexane, dichloromethane, as well as alcohols such as ethanol, isopropanol, n-propanol, etc., and mixtures thereof. The solution of one or monomers can be applied using spin coating or dip coating. The forming step can also be performed by contacting the glass substrate with a gas comprising the one or more monomers using chemical vapor deposition. In some embodiments, the forming step further comprises heating the substrate and SAM such that the SAM is covalently bonded to the substrate.

In some embodiments, the first functional group capable of covalently bonding to the glass substrate is a silane. In some embodiments, the second functional group capable of covalently bonding to the metal is a thiol (i.e., SH). The monomer has the structure $X_3$—Si—$(C_nH_y)$-$(LH)_m$ where n is from 1 to 20, y is from 2n−2 to 2n, m is 1 to 3, X is a leaving group, and L is a Group VI element, for example, S, Se, Te, but not O. The hydrocarbon chain can be saturated (x=2n, e.g., —$C_{10}H_{20}$-L), unsaturated (x=2n−2, e.g., —$C_{10}H_{18}$-L), branched, crosslinked, or cyclic. In some embodiments, n is from 4 to 8 (for a SAM of thickness about 1-2 nm). X is a leaving group such as O-alkyl (e.g., methoxy, ethoxy), or halo (e.g., Cl). In some embodiments, the second functional group is a thiol (e.g., —SH).

After formation of the covalent bonds to the substrate surface, the metal layer can be formed. Methods of forming the metal layer are not particularly limiting. In some embodiments, the metal layer is formed by contacting the SAM with a solution comprising metal atoms or metal ions. In some embodiments, the metal layer is formed by contacting the SAM with metal atoms using physical vapor deposition or other suitable deposition methods. After a wetting layer of metal is formed, additional metal thickness can be added to the substrate by any suitable deposition method, such as sputtering. The metal layer can comprise any metal that forms a covalent bond with L, for example S. Suitable metals include copper, gold, silver, platinum, or the like. In some embodiments, the metal is silver and L is sulfur. To form a low-E coating, the total metal thickness can be from 3-20 nm, or more typically from 5-20 nm.

Figure 2:
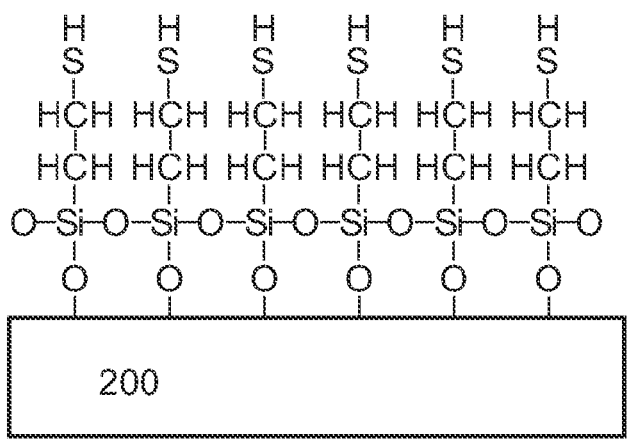
FIG. 2 shows a schematic illustration of one step of a method for forming a low emissivity coating on a substrate.
Figure 2:
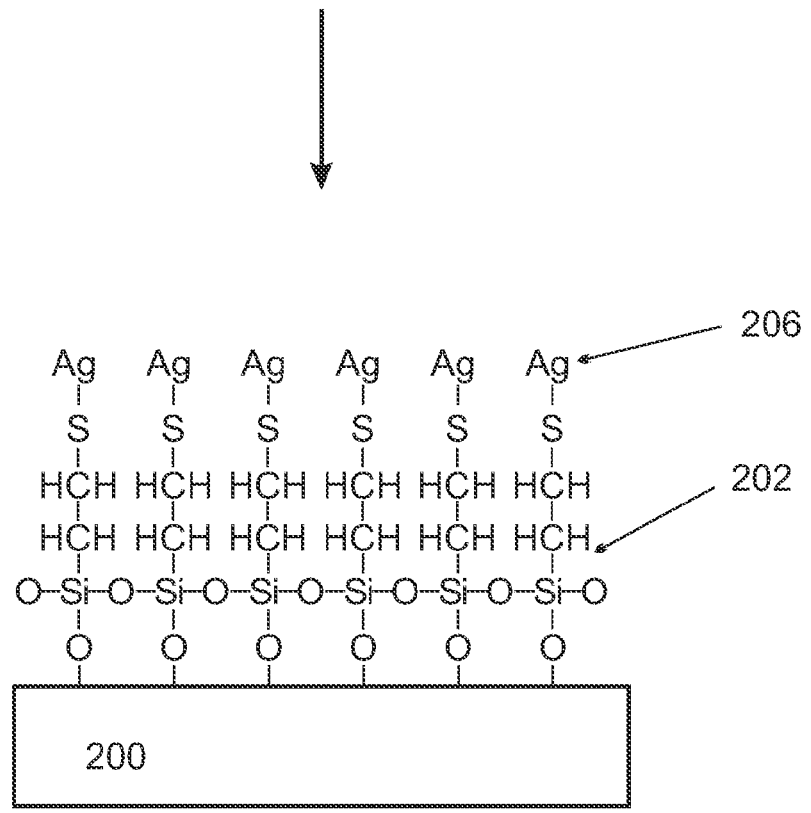

These steps are illustrated schematically in FIGS. 1 and 2. In FIG. 1, a substrate 100 having reactive hydroxyl groups is shown (e.g., silanol residues on a silica substrate). A monomer 104 is placed into contact with the substrate 100 and forms a SAM 102 on the surface of substrate 100. Monomer 104 is shown as a silane thiol having a short alkyl chain, where n is 2, L is S, and m is 1. R is not shown specifically, but can be, for example, alkoxy. Monomers 104 self assemble into a SAM, and after heat treatment, are covalently bonded to substrate 100.

In FIG. 2, a substrate 200 is shown with a SAM 202 formed from the same monomer 104 depicted in FIG. 1. The substrate 200 with SAM 202 is contacted with metal to form metal layer 206, shown as silver. This low-E coating contains a thin layer of SAM formed from a silane having a short alkyl chain, where the thickness of the SAM is less than 10 Å and there is a single monolayer of Ag. The method can further comprise depositing additional metal on the metal layer. Additional coatings (not shown) can optionally be applied. The additional coatings can be passivation layers (e.g., $SiO_2$) to prevent oxidation, antireflection coatings, scratch-resistant coatings (e.g., diamond), anti-soiling coatings, anti-wetting coatings, and the like, as appropriate for specific end uses.

The solution comprising one or more monomers can be applied to the glass substrate using any convenient method, such as one or more methods selected from dip-coating, spin coating, spray coating, roll coating, or curtain coating. In some embodiments, the one or more monomers can be applied to the glass substrate using vapor deposition methods. For example, low molecular weight monomers can be provided via chemical vapor deposition. The gaseous monomers contact the glass substrate, and form a monolayer on the substrate. In particular, the first functional group capable of covalently bonding to the glass substrate can be a thiolated silane (e.g., $X_3$—Si—$(CH_2)_n$—SH), where the $X_3$—Si— portion of the silane is polar and hydrogen bonds with the polar glass substrate, and the hydrocarbon portion of the silane is nonpolar and orients away from the glass surface.

The surface of the glass substrate can be treated to clean and activate the surface to optimize reaction of the functional group with the surface. When the first functional group is a silane, the surface of the glass substrate can be treated to clean and activate the surface to optimize reaction of the silane with the surface. For example, treatment with organic solvents can be used to remove adsorbed organic molecules. Exposure to strong acids or to an oxygen plasma can be used to remove adsorbed molecules. In addition, to enhance reactivity with the glass surface, some water should be present, either in the solvent(s) used to prepare the solution comprising one or more monomers, or in the atmosphere contacting the substrate in a CVD process.

The deposited thin films can then be heat treated to remove excess solvent, and promote covalent bonding of the functional group with the glass substrate (e.g., to form —Si—O—Si— bonds with the SAM). After application to the substrate, the solution can be heated or processed at room temperature, the temperature typically in the range of from about 20° C. to about 400° C. The solution and substrate can be heated together, or the coating may be selectively heated using methods such as IR laser annealing, UV RTP, or microwave processing.

Applications

The low-E coatings can be used in any application where it is desired that visible light be allowed to pass while infrared light is reflected. The low-E coatings can advantageously be used in architectural glass for residential and commercial buildings, where the low-E glass provides reduced heating and cooling costs. The low-E coatings can be used in windows of vehicles such as cars, trucks, airplanes, and boats where the low-E coatings can improve environmental control and occupant comfort. The low-E coatings can also be used as dichroic filters in optical applications. For example, the substrates can include optical glass used in optical components such as windows, filters, prisms, lenses and components of optoelectronic devices.

Advantages of the Low-E Coatings

The formation of SAMs provides a useful way to obtain ordered monolayers. The growth process of SAMs is easy, and can be performed in solution by spin coating or dipping, thus reducing overall manufacturing costs.

The head group of the SAM monomer reacts with the substrate surface via strong chemisorptions, leading to thermodynamically stable monolayers.

The SAMs process is readily scalable up to meter size substrates, which facilitates the industrial requirement for coating large surfaces such as windows.

The SAM is itself highly transparent to visible wavelengths. The thickness of the resulting seeding layer can be tuned by choice of n (an integer number), and the thickness can be as thin as a few Angstroms, minimizing the absorption of this layer.

The thickness of the metal layer sufficient to achieve good low-E performance is less when the layer is deposited on a SAM as described herein than when the layer is deposited directly on glass, because the uniformity of the layer is better and uniform coating is possible with less deposited metal. The higher quality (uniformity) of the metal film allows for a thinner metal layer, which improves the visible light transmission properties of a low-E product. As a result, the thin SAMs layer is transparent in the visible wavelength regime.

The manufacturing process makes possible a thinner metal layer, which minimizes material changes as a result of tempering, compared to a thicker metal layer. This property allows for the same visual appearance of low-E products between as-coated products and tempered products, and allows for the same inventory for both category of products, reducing overall manufacturing complexities and supply-chain costs.

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A method of preparing a low emissivity coating on a substrate, the method comprising
    forming a self-assembled monolayer (SAM) on a surface of a glass substrate, and
    depositing a metal on the SAM;
    wherein the SAM comprises an assembly of one or more monomers comprising a first functional group capable of covalently bonding to the glass substrate and a second functional group capable of covalently bonding to a metal atom in the metal layer, and
    wherein the monomer has the structure $X_3$—Si—$(C_nH_y)$-$(LH)_m$ where n is from 1 to 20, y is from 2n−2 to 2n, X is a leaving group, m is 1 to 3, and L is a Group VI element.

2. The method of claim 1, wherein the forming step comprises contacting the surface of the glass substrate with a solution comprising the one or more monomers and a solvent.

3. The method of claim 1, wherein the forming step is performed by contacting the glass substrate using chemical vapor deposition with a gas comprising the one or more monomers.

4. The method of claim 1, wherein the forming step further comprises heating the glass and SAM such that the SAM is covalently bonded to the glass substrate.

5. The method of claim 1, wherein the step of depositing a metal on the SAM is performed by contacting the SAM with a solution comprising metal ions.

6. The method of claim 1, wherein the step of depositing a metal on the SAM is performed by contacting the SAM with metal atoms using physical vapor deposition.

7. The method of claim 1, wherein the metal is silver.

8. The method of claim 1, further comprising depositing additional metal on the metal layer.

9. The method of claim 1, wherein the metal layer has a thickness of from 3 to 20 nm.

10. The method of claim 1, further comprising depositing an antireflective coating on the metal layer.

11. The method of claim 1, wherein the first functional group is a silane.

12. The method of claim 1, wherein L is S.

13. The method of claim 1, wherein the second functional group is a thiol.

14. A glass substrate comprising a low emissivity coating made according to the method of claim 1.

15. A low emissivity coating on a glass substrate comprising
- a SAM and a metal layer,
- wherein the SAM forms a monolayer on the surface of the glass substrate having one surface of the monolayer disposed in contact with the glass substrate and one surface of the monolayer disposed in contact with the metal layer,
- wherein the SAM comprises one or more monomeric subunits of the following structure: —Si—$(C_nH_y)$-$(LM)_m$ where n is from 1 to 20, y is from 2n−2 to 2n, m is 1 to 3, L is a Group VI element, and M is a metal, and
- wherein one surface of the SAM is bonded to the glass substrate and the other surface of the SAM is bonded to metal atoms in the metal layer.

16. The coating of claim 15, wherein the metal layer has a thickness of from 3 and 20 nm.

17. The coating of claim 15, wherein the metal layer comprises silver.

18. The coating of claim 15, wherein L is S.

19. The coating of claim 15, wherein the glass is window glass or optical glass.

20. The coating of claim 15, further comprising an antireflection coating on the metal layer.

* * * * *